United States Patent
DeVal et al.

(10) Patent No.: US 8,051,266 B2
(45) Date of Patent: Nov. 1, 2011

(54) AUTOMATIC MEMORY MANAGEMENT (AMM)

(75) Inventors: Gary J. DeVal, Raleigh, NC (US); Curtis E. Hrischuk, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 652 days.

(21) Appl. No.: 11/761,026

(22) Filed: Jun. 11, 2007

(65) Prior Publication Data
US 2008/0307183 A1 Dec. 11, 2008

(51) Int. Cl.
*G06F 12/00* (2006.01)
(52) U.S. Cl. .................... 711/168; 707/813
(58) Field of Classification Search .............. None
See application file for complete search history.

(56) References Cited

U.S. PATENT DOCUMENTS
2007/0033240 A1* 2/2007 Barsness et al. ............ 707/206
2008/0281886 A1* 11/2008 Petrank et al. .............. 707/206
* cited by examiner

*Primary Examiner* — Gary Portka
(74) *Attorney, Agent, or Firm* — Steven M. Greenberg, Esq.; Carey, Rodriguez, Greenberg & Paul

(57) ABSTRACT

The present invention manages the execution of multiple AMM cycles to reduce or eliminate any overlap. Specifically, the present invention provides an external supervisory process to monitor the AMM behavior of VMs on one or more nodes, and intervene when coincident AMM activity appears to be imminent. If AMM patterns suggest that two VMs are likely to perform a (e.g., a major) AMM cycle simultaneously (or with significant overlap) in the near future, the supervisory process can trigger one of the VMs to AMM immediately, or at the first 'safe' interval prior to the predicted AMM collision. This will have the effect of desynchronizing the AMM behavior of the VMs and maintaining AMM latency for both VMs within the expected bounds for their independent operation, without any inter-VM effects.

22 Claims, 2 Drawing Sheets

AUTOMATIC MEMORY MANAGEMENT (AMM)

BACKGROUND OF THE INVENTION

1. Field of the Invention

The present invention generally relates to Automatic Memory Management (AMM) coordination that is used by virtual machines to manage memory usage. Specifically, the present invention manages the execution of AMM agents' AMM cycles on a common server or system to minimize or eliminate any overlap between resource intensive memory management activities.

2. Related Art

Session Initiation Protocol (SIP) performance testing on various application servers revealed a problem with managing Automatic Memory Management (AMM) coordination latency in a clustered environment. It also applies to Hypertext Transfer Protocol (HTTP) sessions that are long lived, such as a shopping web site or a web site that hosts presentations. Some applications, which may be deployed on server clusters, are sensitive to message or request latency. For example, SIP signaling has request/response latency limits built into the messaging protocol, violation of which may trigger excessive message retransmission or SIP call failure. Retransmissions can dramatically increase the effective load on the network and servers without creating any additional value, thus decreasing the efficiency and increasing the cost of supporting a given level of service. Therefore it is critical to control request/response latency on networks supporting SIP or other latency-sensitive services. A key factor affecting latency in systems implemented using Java (or any other technology which relies on AMM) is the duration of foreground or 'major' resource intensive AMM activity (Java, Java Virtual Machine (JVM), and related terms are trademarks of Sun Microsystems, Inc. in the United States and/or other countries). During major AMM activity the system suspends all other processing or can reduce the amount of resources available to support an application, thus increasing the latency of any in-process transactions by an amount equal to the duration of the AMM activity. Therefore, managing major AMM duration is a well-recognized issue in the implementation of latency-sensitive web applications deployed on AMM-based systems such as Java. Web application servers may be scaled and/or deployed in High Availability (HA) mode by clustering (e.g., by logically grouping multiple Virtual Machines (VMs) on one or multiple processing platforms, into a single service-providing entity called a 'cluster'). This enables a workload to be shared among multiple VMs, each with its own resource management environment. Specifically, each VM in the cluster can independently manage its own memory allocation, including its AMM activities. A cluster is a logical entity, which is a collection of processes that runs on one or more hardware servers, with one or more processes per server. A vertically scaled system is where several VMs execute on a single server. A horizontally scaled system is where several VMs execute on more than one hardware server. Within a vertically-scaled cluster (e.g., multiple VMs on one node), the existence of multiple independent AMM processes adds additional complexity to the issue of AMM latency due to the possibility of simultaneous AMM cycles occurring in the cluster. If multiple VMs on a single node attempt to perform AMM concurrently, the duration of one or more of the AMM activities will be extended due to the competition for the CPU with the other AMM work going on. This may result in AMM latency that is much longer than would be the case if the VMs were not on the same node. For example, if VM1 takes 500 milli-seconds for an AMM cycle and VM2 takes 500 milli-seconds for an AMM cycle, then if they both start at the same time, both will take 1 second during which no application processing is occurring. The problem of unpredictably excessive latency caused by simultaneous overlapping AMM cycles can be addressed by oversizing the processing capacity of the node, or by undersizing the workload allocated to the node, but these approaches will not be cost effective and are still vulnerable to unpredictable variations in AMM cycle latency caused by concurrent AMM cycles, as described previously. Therefore, there exists a need for an approach that addresses at least one of the above-referenced issues.

SUMMARY OF THE INVENTION

In general, the present invention addresses the above-referenced issues by managing/coordinating the execution of multiple AMM cycles to reduce or eliminate any overlap. An example of an AMM is system garbage collection agent in a Java Virtual Machine that reclaims memory space that was in use but is currently available for use. Other virtual machines (e.g., LISP, NET, etc.) have similar AMM systems for reclaiming memory that was used but is now freed. Specifically, the present invention provides an external supervisory process to monitor the AMM behavior of VMs on one or more nodes, and intervene when coincident AMM cycles/activity appears to be imminent. If AMM patterns suggest that two VMs are likely to perform a (e.g., a major) AMM cycle simultaneously (or with overlap) in the near future, the 'supervisory' process of the present invention can reschedule at least one of the two AMM cycles (e.g., trigger one of the VMs to initiate its AMM cycle earlier, or at the first 'safe' interval prior to the predicted AMM cycle collision, etc.). This will have the effect of desynchronizing the AMM behavior of the VMs and maintaining AMM latency for both VMs within the expected bounds for their independent operation, without any inter-VM effects.

It should also be understood that, a VM may have multiple memory management agents that use different policies. As such, the teachings recited herein are not limited to one source of AMM type activity in a VM. For example, one type of hierarchy is: one cluster contains many VMs; a VM has at least one memory management agent (i.e., AMM algorithm), each memory management agent has at least one memory segment (i.e., heap) to manage. The present invention provides a finer grain management whereby each memory management agent may have a different priority or Quality of Service, so that the AMM activity of all agents in a VM are not synchronized to occur simultaneously. As such, the management of the memory management agent's activities in a VM is finer grained per agent and not per VM.

A first aspect of the present invention provides a method for Automatic Memory Management (AMM) coordination, comprising: predicting when a first AMM cycle on a node and a second AMM cycle on the node will occur; determining whether an overlap of the first AMM cycle with the second AMM cycle will occur; and rescheduling at least one of the first AMM cycle and the second AMM cycle if an overlap will occur.

A second aspect of the invention provides a system for Automatic Memory Management (AMM) coordination, comprising: a module for predicting when a first virtual machine on a node will enter a first AMM cycle and a second virtual machine on the node will enter a second AMM cycle; a module for determining whether an overlap of the first AMM cycle with the second AMM cycle will occur; and a module for rescheduling at least one of the first AMM cycle and the second AMM cycle if the overlap will occur.

A third aspect of the invention provides a program product stored on a computer readable medium for Automatic Memory Management (AMM) coordination, the computer readable medium comprising program code for causing a computer system to: predict when a first virtual machine on a node will enter a first AMM cycle and a second virtual machine on the node will enter a second AMM cycle; determine whether an overlap of the first AMM cycle with the second AMM cycle will occur; and reschedule at least one of the first AMM cycle and the second AMM cycle if the overlap will occur.

A fourth aspect of the invention provides a method for deploying a system for Automatic Memory Management (AMM) coordination, comprising: providing a computer infrastructure being operable to: predict when a first virtual machine on a node will enter a first AMM cycle and a second virtual machine on the node will enter a second AMM cycle; determine whether an overlap of the first AMM cycle with the second AMM cycle will occur; and reschedule at least one of the first AMM cycle and the second AMM cycle if the overlap will occur.

A fifth aspect of the invention provides computer software embodied in a propagated signal for Automatic Memory Management (AMM) coordination, the computer software comprising instructions for causing a computer system to: predict when a first virtual machine on a node will enter a first AMM cycle and a second virtual machine on the node will enter a second AMM cycle; determine whether an overlap of the first AMM cycle with the second AMM cycle will occur; and reschedule at least one of the first AMM cycle and the second AMM cycle if the overlap will occur.

A sixth aspect of the present invention provides a data processing system for Automatic Memory Management (AMM) coordination, comprising: a memory medium comprising a set of instructions; a bus coupled to the memory medium; and a processor coupled to the bus that when executing the set of instructions, causes the data processing system to: predict when a first virtual machine on a node will enter a first AMM cycle and a second virtual machine on the node will enter a second AMM cycle; determine whether an overlap of the first AMM cycle with the second AMM cycle will occur; and reschedule at least one of the first AMM cycle and the second AMM cycle if the overlap will occur.

Each of these aspects can also include one or more of the following additional aspects:

The first virtual machine and the second virtual machine both being VMs; the predicting being based on historical data (e.g., pertaining to timing, duration, etc.) for AMM cycles of the node; the historical data comprising next AMM cycle times that specify when the first AMM cycle and the second AMM cycle will each commence; the historical data further comprising at least one AMM duration time that specifies a duration of the first AMM cycle and a duration of the second AMM cycle; the rescheduling being based on a AMM guard time that specifies a desired delay between termination of the first AMM cycle and commencement of the second AMM cycle; and/or the aspects being implemented by a system/process/program that is external to the node.

BRIEF DESCRIPTION OF THE DRAWINGS

These and other features of this invention will be more readily understood from the following detailed description of the various aspects of the invention taken in conjunction with the accompanying drawings in which.

Figure 1:
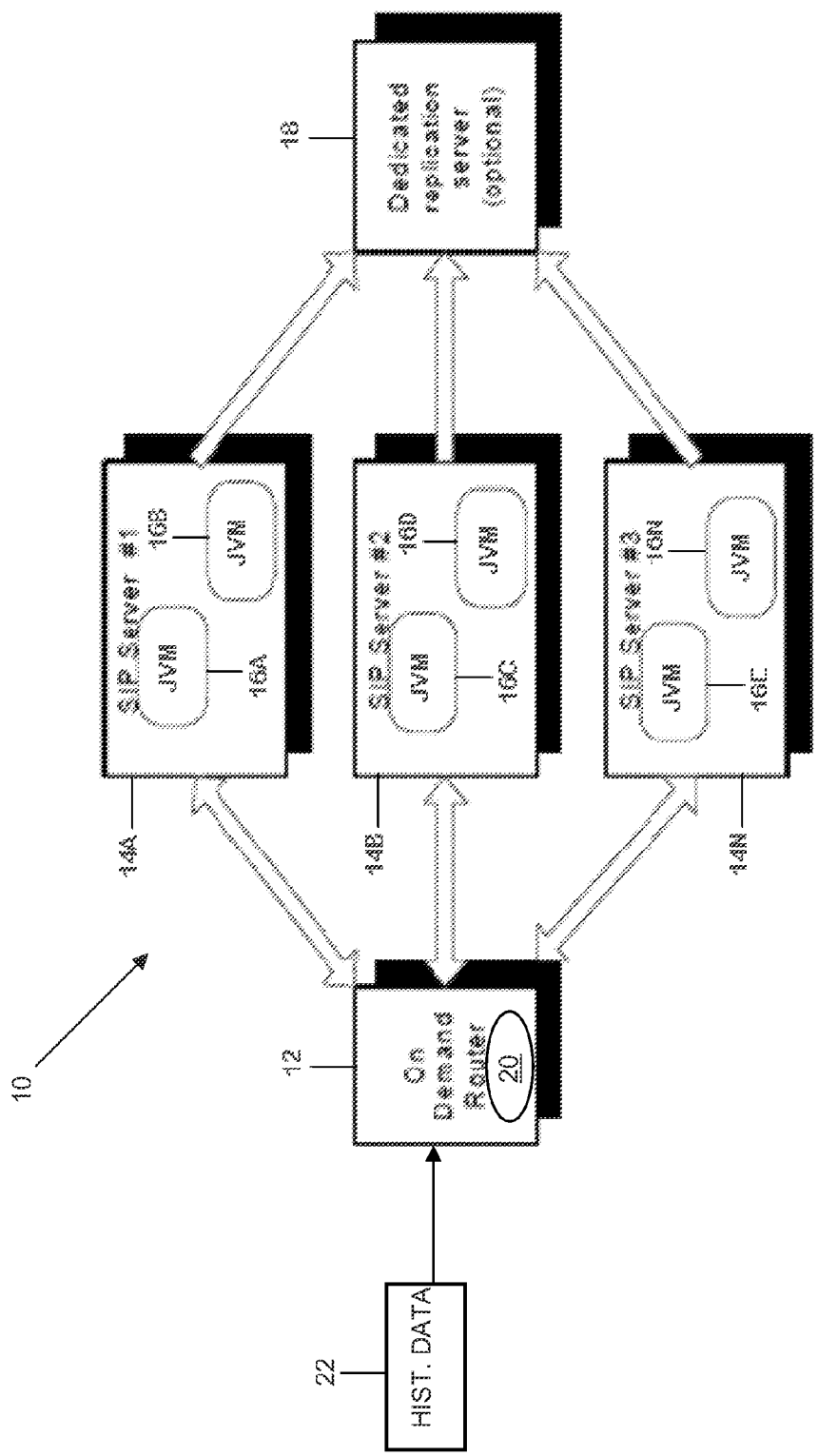
FIG. 1 shows a system for Automatic Memory Management coordination according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Definitions
II. General Description
III. Computerized Implementation I. Definitions For the purposes of this disclosure, the following terms will have the associated definitions:

'Node' is intended to refer to any computing device (e.g., an SIP server) on which an AMM cycle/event could be executed (e.g., by a VM within an application server).

'Next AMM Time' is intended to refer to a time coordinate (day, time, etc.) at which an AMM cycle will commence on a node.

'AMM Duration Time' is intended to refer to a duration of time that a AMM cycle will be executing once commenced.

'AMM Guard Time' is intended to refer to a desired delay/buffer in time between execution of two or more AMM cycles occurring on a common node.

II. General Description

As indicated above, the present invention addresses the above-referenced issues by managing/coordinating the execution of multiple AMM cycles to reduce or eliminate any overlap. Specifically, the present invention provides an external supervisory process to monitor the AMM behavior of VMs on one or more nodes, and intervene when coincident AMM cycles/activity appears to be imminent. If AMM patterns suggest that two VMs are likely to perform a (e.g., a major) AMM cycle simultaneously (or with overlap) in the (e.g., near future), the 'supervisory' process of the present invention can reschedule at least one of the two AMM cycles (e.g., trigger one of the VMs to initiate its AMM cycle earlier, or at the first 'safe' interval prior to the predicted AMM cycle collision, etc.). This will have the effect of desynchronizing the AMM behavior of the VMs and maintaining AMM latency for both VMs within the expected bounds for their independent operation, without any inter-VM effects.

It should be understood in advance that a certain type and quantity of servers (e.g., SIP) and virtual machines (e.g., VMs) are shown, this need not be the case. That is, the teachings recited herein could be implemented in conjunction with any type/quantity of server, virtual machine, etc. It should also be understood that a VM may have multiple memory management agents that use different policies. As such, the teachings recited herein is not limited to one source of AMM type activity in a VM. For example, one type of hierarchy is: one cluster contains many VMs; a VM has at least one memory management agent (i.e., AMM algorithm), each memory management agent has at least one memory segment (i.e., heap) to manage. The present invention provides a finer grain management whereby each memory management agent may have a different priority or Quality of Service, so that the AMM activity of all agents in a VM are not synchronized to occur simultaneously. As such, the management of making sure the memory management agent's activities in a VM is finer grained per agent and not per VM. Thus, the present invention can coordinate multiple AMM cycles that occur on a node having a single VM.

By removing the possibility of inter-VM AMM synchronization, this invention will enable vertical-clustered configurations to be engineered to more fully use the capacity of the node, and will reduce the variability in AMM latency in the node. This may be necessary to meet SIP latency requirements in clustered environments, especially in HA clusters. The resulting better management of the AMM cycles in the cluster will enable higher throughput and reduced AMM latency, improving our product's competitive posture in the marketplace. In a moderately busy VM, inter-AMM intervals are typically on the order of 10's of seconds, (e.g., a Java global memory garbage collection) AMM every 50 or 60 seconds. AMM frequency is driven by the processing load on the server, and will be reasonably periodic when the system is under relatively stable load. Therefore it is possible for a supervisory system to predict when a VM will have it's next AMM within an accuracy of a few seconds based on knowing the historical AMM pattern of the VM for the past few AMM cycles and the differential between the load currently being offered to the system and the load offered during the AMM history period. These times are referred to herein as 'next AMM cycle times'. AMM duration should be kept to less than a few hundred milliseconds in order for latency-sensitive applications to operate acceptably. There is thus a disparity in duration of inter-AMM intervals and AMM activity itself of approximately two orders of magnitude. This provides an ample time window for the supervisory system to manipulate AMM timing to avoid coincident AMM cycles, without requiring impractical precision of AMM forecasting.

An illustrative system where this can be applied is shown in the diagram of FIG. 1. Specifically, FIG. 1 depicts an application server SIP cluster 10 with an on-demand router ODR 12, a set of hardware nodes 14A-N, and an optional dedicated replication server 18. In this illustrative embodiment, each node 14A-N comprises a SIP server with two application servers (labeled as VMs 16A-N that they each would contain) running on each nodes 14A-N. A load balancer 20 in ODR 12 provides a supervisory function for cluster 10, and gathers information from the clustered servers/nodes 14A-N about their status in order to make load distribution decisions. The timing and duration of Global AMM cycles would be added to the information reported by the servers, enabling the ODR 12 to maintain a AMM history for each VM 16A-N and node 14A-N in cluster 10. The AMM history can be used to predict the timing of the next AMM for each VM 16A-N. When multiple predicted server AMM cycles fall within an unacceptably small timeframe, suggesting high likelihood of concurrent AMM activity, the ODR 12 uses its administrative channels to the servers to trigger major AMM cycles early, in "safe" (non-coincident) timeframes. The key runtime parameters for the ODR 12 to manage AMM concurrency on the VMs within a vertical cluster are: AMM Guard Time. This parameter specifies the buffer time which ODR 12 will target to preserve between predicted AMM cycles to minimize likelihood of concurrency. AMM Guard Time would typically start with a default value of e.g., 1 second, and would be adjusted autonomously based on runtime behavior of the system. The adjustment would be controlled by a function F1 that could use as input historical data gathered by ODR 12 about the accuracy of its prior predictions. In general, as the accuracy with which the ODR 12 is predicting the Next AMM Time and Next AMM Duration improves, the AMMGuardTime could be reduced, and vice-versa. AMM Guard Time is managed and updated asynchronously from the AMM prediction/management functions. The Next AMM Time is the time when the next AMM cycle is predicted to occur for a given VM. This is calculated autonomically by the ODR 12 using a function F1, which may take as inputs historical data about prior AMM times for the given VM and historical and current workload on the VM. The Next AMM Duration Time is the predicted duration of the next AMM cycle for a given VM 16A-N. This is calculated autonomically by the ODR 12 using a function F2, which takes as inputs historical data 22 about prior AMM durations for the given VM 16A-N, historical and current heap status (free tenured space after AMM) for the given VM, and historical and current workload for the VM. The ODR 12 maintains a consolidated outlook ('schedule') of predicted AMM cycles for all VMs 16A-N in the vertical cluster, so that when the Next AMM Time and Next AMM Duration time predictions are calculated for a VM 16A-N, the ODR 12 can readily assess the likelihood of collision of that VM's next AMM with upcoming (predicted) AMM cycles of other VMs in the cluster. This requires another function F3, which takes as input the Next AMM Time(s), Next AMM Duration Time(s), and AMM Guard Time(s), and returns a Boolean, "true" if the predicted AMM parameters collide/overlap with another previously predicted AMM cycle for another VM in the vertical cluster. The ODR algorithm for avoiding concurrent AMM cycles in the vertical cluster must handle at least three situations:

1. No AMM cycle overlap/collision predicted: If the calculation of NextAMMTime and NextAMMDuration show that the next AMM for VMx is not expected to coincide with other AMM cycles on the node, no action is required.

2. AMM cycle overlap/collision predicted, early AMM solution: If the AMM prediction for VMx shows a likely collision, but there is open space in the AMM schedule for this VM to AMM earlier than predicted, ODR will trigger AMM for the VM.

3. AMM cycle overlap/collision predicted, schedule full: If a AMM cycle collision is predicted and no open AMM schedule slots exist, then ODR will throttle workload to this VM to defer its next AMM beyond the current predicted time. The selection of an earlier AMM time to avoid a AMM collision requires another function, F 4, which takes as input the Next AMMDurationVMx, NextAMMTimeVMx, and AMMGuardTime, and uses the AMM schedule maintained by ODR for the managed node to find the earliest available timeslot in which the needed AMM could be executed without collision. Function F4 could return some invalid value (e.g., −1) to indicate that no earlier AMM slot is available for a AMM of the duration requested.

The ODR algorithm for avoiding concurrent AMM cycles is then as follows:

```
for each server
    set AMMCollision (true/false) with the results of function F3
    for VMx
    if AMMCollision
    then
        execute function F4 for VMx
        if F4 returns a valid value,
        then
            schedule VMx to AMM in the returned timeslot
```

-continued

```
        else
            throttle work to VMx (causing VMx's AMM to be
            deferred by reduced activity )
        endif
    endif
endfor
```

III. Computerized Implementation

Figure 2:
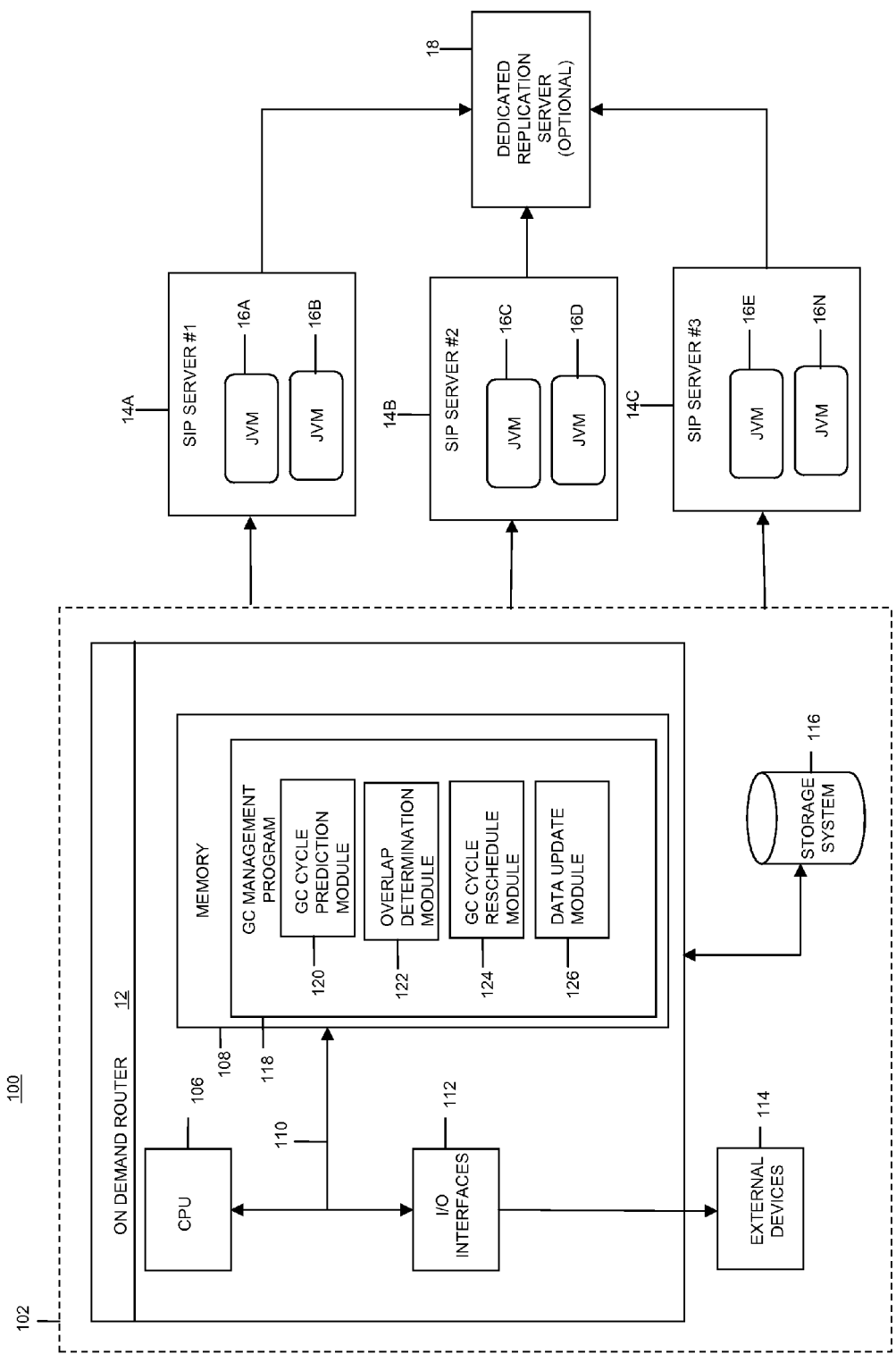
FIG. 2 shows a more detailed computerized implementation of the system of FIG. 1 according to the present invention.

Referring now to FIG. 2, a computerized implementation 100 of the present invention is shown. As depicted, implementation 100 includes on demand router 12 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, on demand router 12 includes a processing unit 106, a memory 108, a bus 110, and input/output (I/O) interfaces 112. Further, on demand router 12 is shown in communication with external I/O devices/resources 114 and storage system 116. In general, processing unit 106 executes computer program code, such as AMM management program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in on demand router 12. External devices 114 can comprise any devices (e.g., keyboard, pointing device, display, etc.) that enable a user to interact with on demand router 12 and/or any devices (e.g., network card, modem, etc.) that enables on demand router 12 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, on demand router 12 is only representative of various possible computer systems that can include numerous combinations of hardware. To this extent, in other embodiments, on demand router 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any module for exchanging information with one or more external device 114. Still further, it is understood that one or more additional components (e.g., system software, math co-processing unit, etc.) not shown in FIG. 2 can be included in on demand router 12. However, if on demand router 12 comprises a handheld device or the like, it is understood that one or more external devices 114 (e.g., a display) and/or storage system 116 could be contained within on demand router 12, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into on demand router 12. It should be understood that although not shown, SIP servers/nodes 14A-N generally comprise computerized components similar to on demand router 12.

Shown in memory 108 of on demand router 12 is AMM management program 118 (shown in FIG. 1 as load balancer 20), which includes AMM cycle prediction module 120, overlap determination module 122, AMM cycle reschedule module 124, and data update module 126. These modules provide the functions of the present invention. Specifically, AMM prediction module will predict when AMM cycles a node such as SIP server 14A will occur. It will do so by accessing historical data (e.g., from storage system 118). Typically the historical data includes details regarding when VMs 18A-N will commence a AMM cycle (e.g., next AMM cycle times), and how long each AMM cycle will last (e.g., at least one AMM duration time). In any event, overlap determination module 122 will determine whether any overlaps/collisions between AMM cycles on a common node will occur. If so, AMM cycle reschedule module 124 will reschedule one or more of such AMM cycles to avoid or minimize any such overlaps/collisions. In a typical embodiment, AMM reschedule module 124 will reschedule one or more of the overlapping AMM cycles based on at least one AMM guard time that specifies a desired delay between termination of one AMM cycle and commencement of a another, overlapping AMM cycle on a common node.

While shown and described herein as a method and framework for AMM cycles, it is understood that the invention further provides various alternative embodiments. For example, in one embodiment, the invention provides a computer-readable/useable medium that includes computer program code to enable a computer infrastructure to manage AMM cycles. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to manage AMM cycles. In this case, the service provider can create, maintain, support, etc., a computer infrastructure, such as computer infrastructure 102 (FIG. 2) that performs the process of the invention for one or more customers. In return, the service provider can receive payment from the customer(s) under a subscribe and/or fee agreement and/or the service provider can receive payment from the sale of advertising content to one or more third parties.

In still another embodiment, the invention provides a computer-implemented method for AMM cycles. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as on demand router 12 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for Automatic Memory Management (AMM) coordination, comprising:
predicting when a first AMM cycle on a node and a second AMM cycle on the node will occur;
determining whether an overlap of the first AMM cycle with the second AMM cycle will occur;
determining whether one of the first AMM cycle and the second AMM cycle can be rescheduled to an open AMM slot if the overlap will occur; and
upon determining that the first AMM cycle and the second AMM cycle cannot be rescheduled to an open AMM slot to prevent the overlap, throttling workload to the node to defer the first AMM cycle beyond a current predicted time for the first AMM cycle.

2. The method of claim 1, wherein
the first AMM cycle being implemented by a first Virtual Machine (VM) on the node and
the second AMM cycle being implemented by second VM on the node.

3. The method of claim 1, further comprising
utilizing historical data for at least one of the predicting and the determining.

4. The method of claim 3, wherein
the historical data comprising next AMM cycle times that specify when the first AMM cycle and the second AMM cycle will commence.

5. The method of claim 4, wherein
the historical data further comprising at least one AMM duration time that specifies a duration of the first AMM cycle and a duration of the second AMM cycle, the determining further comprising using the next AMM cycle times and the at least one AMM duration time to determine whether the overlap will occur.

6. The method of claim 5, wherein
the determining whether one of the first AMM cycle and the second AMM cycle can be rescheduled being based on a AMM guard time that specifies a desired delay between termination of the first AMM cycle and commencement of the second AMM cycle.

7. The method of claim 1, wherein
the method being implemented by a system that is external to the node.

8. A system for Automatic Memory Management (AMM) coordination, comprising:
a module for predicting when a first virtual machine on a node will enter a first AMM cycle and a second virtual machine on the node will enter a second AMM cycle;
a module for determining whether an overlap of the first AMM cycle with the second AMM cycle will occur; and
a module for determining whether one of the first AMM cycle and the second AMM cycle can be rescheduled to an open AMM slot if the overlap will occur; and
a module for, upon determining that the first AMM cycle and the second AMM cycle cannot be rescheduled to an open AMM slot to prevent the overlap, throttling workload to the node to defer the first AMM cycle beyond a current predicted time for the first AMM cycle.

9. The system of claim 8, wherein
the first virtual machine and the second virtual machine both being Virtual Machines (VMs).

10. The system of claim 8, wherein
the system utilizing historical data.

11. The system of claim 10, wherein
the historical data comprising next AMM cycle times that specify when the first AMM cycle and the second AMM cycle will commence.

12. The system of claim 11, wherein
the historical data further comprising at least one AMM duration time that specifies a duration of the first AMM cycle and a duration of the second AMM cycle, the module for determining using the next AMM cycle times and the at least one AMM duration time to determine whether the overlap will occur.

13. The system of claim 12, further comprising
a module for rescheduling utilizing a AMM guard time that specifies a desired delay between the first AMM cycle and the second AMM cycle to reschedule the at least one of the first AMM cycle and the second AMM cycle,
the module for rescheduling being configured to reschedule the at least one of the first AMM cycle and the second AMM cycle if the first AMM cycle is predicted to terminate less than the AMM guard time before the second AMM cycle is predicted to commence.

14. The system of claim 8, wherein
the system being implemented external to the node.

15. A program product stored on a computer readable storage medium for Automatic Memory Management (AMM) coordination, the computer readable medium comprising program code for causing a computer system to:
    predict when a first virtual machine on a node will enter a first AMM cycle and a second virtual machine on the node will enter a second AMM cycle;
    determine whether an overlap of the first AMM cycle with the second AMM cycle will occur; and
    determine whether one of the first AMM cycle and the second AMM cycle can be rescheduled to an open AMM slot if the overlap will occur; and
    upon determining that the first AMM cycle and the second AMM cycle cannot be rescheduled to an open AMM slot to prevent the overlap, throttle workload to the node to defer the first AMM cycle beyond a current predicted time for the first AMM cycle.

16. The program product of claim 15, wherein
the first virtual machine and the second virtual machine both being Java Virtual Machines (VMs).

17. The program product of claim 15, the computer readable medium further comprising program code for causing the computer system to obtain and utilize historical data.

18. The program product of claim 15, wherein
the historical data comprising next AMM cycle times that specify when the first AMM cycle and the second AMM cycle will commence.

19. The program product of claim 18, wherein
the historical data further comprising at least one AMM duration time that specifies a duration of the first AMM cycle and a duration of the second AMM cycle, the computer readable medium further comprising program code for causing the computer system to use the next AMM cycle times and the at least one AMM duration time to determine whether the overlap will occur.

20. The program product of claim 19, the computer readable medium further comprising program code for causing the computer system to utilize a AMM guard time that specifies a desired delay between the first AMM cycle and the second AMM cycle to reschedule the at least one of the first AMM cycle and the second AMM cycle, the computer readable medium further comprising program code for causing the computer system to reschedule the at least one of the first AMM cycle and the second AMM cycle if the first AMM cycle is predicted to terminate less than the AMM guard time before the second AMM cycle is predicted to commence.

21. The program product of claim 15, wherein
the program product being implemented external to the node.

22. A method for deploying a module for Automatic Memory Management (AMM) coordination, comprising:
    providing a computer infrastructure being operable to:
    predict when a first virtual machine on a node will enter a first AMM cycle and a second virtual machine on the node will enter a second AMM cycle;
    determine whether an overlap of the first AMM cycle with the second AMM cycle will occur; and
    determine whether one of the first AMM cycle and the second AMM cycle can be rescheduled to an open AMM slot if the overlap will occur; and
    upon determining that the first AMM cycle and the second AMM cycle cannot be rescheduled to an open AMM slot to prevent the overlap, throttle workload to the node to defer the first AMM cycle beyond a current predicted time for the first AMM cycle.

* * * * *